C. H. KUGLER.
TRACTOR.
APPLICATION FILED JAN. 22, 1916.
1,343,783.
Patented June 15, 1920.
2 SHEETS—SHEET 2.
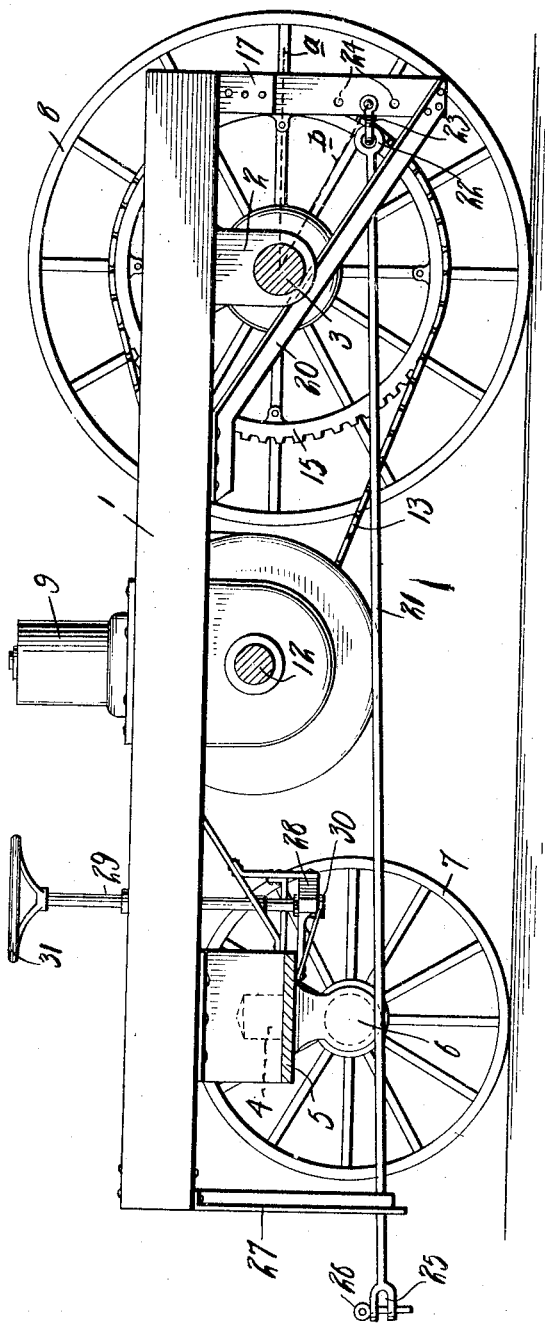
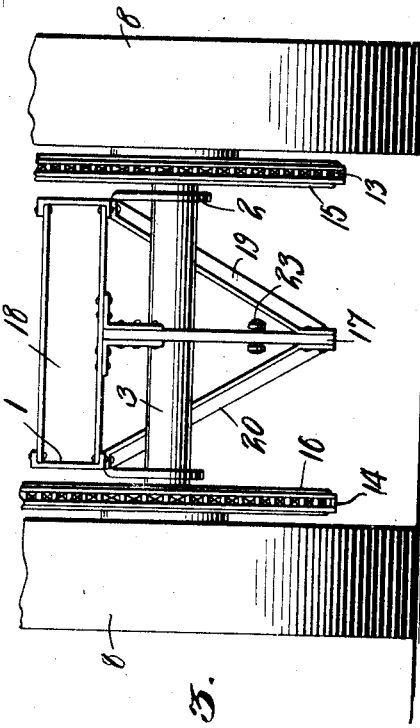
INVENTOR
Charles H. Kugler
WITNESSES
W. C. Fielding,
Lloyd W. Patch
BY Richard B. Owen.
ATTORNEY

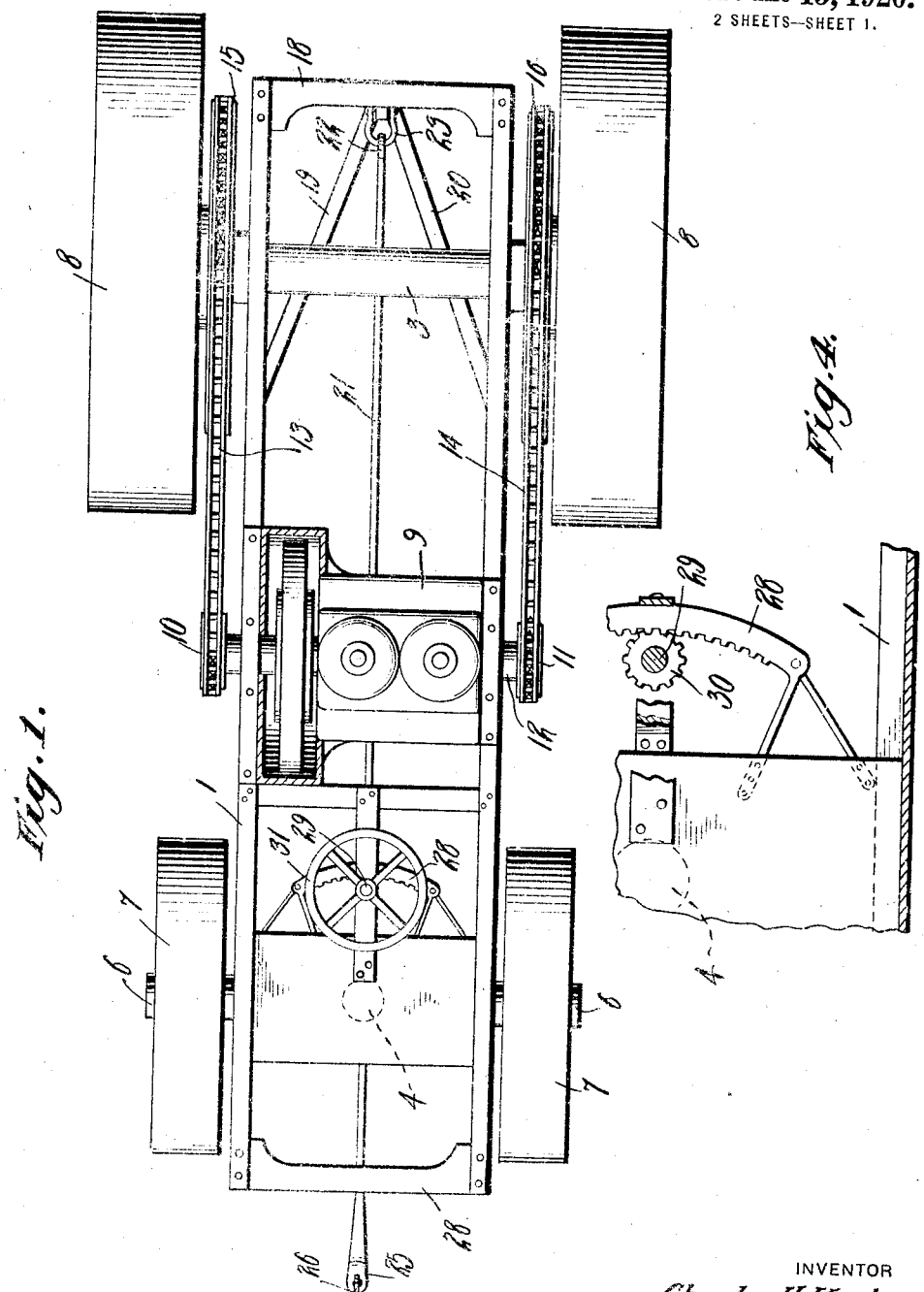

UNITED STATES PATENT OFFICE.

CHARLES H. KUGLER, OF COZAD, NEBRASKA.

TRACTOR.

1,343,783.

Specification of Letters Patent. Patented June 15, 1920.

Application filed January 22, 1916. Serial No. 73,653.

*To all whom it may concern:*

Be it known that I, CHARLES H. KUGLER, a citizen of the United States, residing at Cozad, in the county of Dawson and State of Nebraska, have invented certain new and useful Improvements in Tractors, of which the following is a specification.

An object of my invention is to provide a power tractor which has the traction wheels mounted forwardly, the hitch being connected in front and in such an arrangement that the tractive weight is increased as the draw bar pull becomes heavier.

A further object is to so construct the parts that adjustment of the front hitch may be made to thus govern the increase in tractive weight which will be consequent to a given load, and to arrange parts of the tractor in such a relation that the course of travel of the same may be guided and will at all times be in the control of the operator.

With the above and other objects in view, my invention consists in certain novel features of construction and combinations of parts which will be hereinafter set forth in connection with the drawings and then pointed out in the claim.

In the drawings:—

Figure 1 is a view in top plan of the device of my invention.

Fig. 2 is a view in side elevation of the mechanism disclosed in Fig. 1.

Fig. 3 is a fragmentary view in rear elevation of the structure.

Fig. 4 is a fragmentary view to better illustrate the arrangement of the steering mechanism.

The frame 1 is provided on its forward end with the bearings 2 which are received around the power axle 3, and at its rear end this frame is mounted through the king pin 4 on the turntable 5, the stub axles 6 being provided to extend from this turntable 5 to have the steering wheels 7 carried thereby. The traction wheels 8 are mounted on the ends of the axle 3 and these wheels are preferably provided with the broad rims and are made of a considerable size to secure the proper weight and bearing surface, and if desired, these traction wheels might be provided with transversely extending ribs or with studs or pins to give a better gripping and holding action on the ground over which the tractor is traveling.

A power plant 9, which in the present instance is shown as an explosive engine, is mounted on the frame 1 between the positioning of the carrying wheels 7 and the traction wheels 8, and the sprocket wheels 10 and 11 are connected on opposite ends of the engine shaft 12, these sprocket wheels being connected by the sprocket chains 13 and 14, to drive the traction wheels 8, the chains 13 and 14 being led over the sprocket wheels 15 and 16 which are rigidly connected with the traction wheels 8 to rotate the same as the engine shaft turns.

A hitch bar 17 is connected with the forward cross bar 18 of the frame at the approximate center thereof, and this hitch bar is made of sufficient length that the lower end thereof is extended well below the horizontal center of the axle 3. The diagonally disposed brace members 19 and 20 are connected with the lower end of the hitch bar 17 and at their inner ends are connected with the side frame members well in from the forward ends thereof, thus forming a very rigid brace structure for the hitch bar 17. A draw bar 21 is provided with a ring 22 on one end and a clevis 23 is connected through this ring 22 and is secured in one of the series of openings at 24. This draw bar 21 is then extended rearwardly beneath the axle 3 and the turn table 5 to have its extreme free end disposed beyond the rear end of the frame 1, the draw bar being bifurcated at 25 and provided with the pins 26 by which connection may be made to a cable or chain, a vehicle tongue, or other part which is to have draft applied thereto. If desired, a supporting yoke 27 may be connected to depend from the rear cross bar 28 of the frame to have the draw bar 21 received therethrough and to prevent displacement of the free end of the draw bar.

A segmental rack 28 is connected with the turntable 5 and is arched around the king pin as a center, a steering post 29 being carried by the frame 1 to extend in such a relation that the lower end thereof is in proximity to this segmental rack 28. A pinion 30 is mounted on the lower end of the steering post 29 to have the teeth thereof to engage with the teeth of the segmental rack, and a steering wheel 31 is mounted on the upper end of the steering post 29 to permit turning of the pinion 30 to cause the segmental rack 28 and consequently the turntable 5 to be swung around the king pin 4 to change the angular disposition of the stub shaft 6 and to consequently steer the course of travel of the tractor.

In the use of the tractor, the load is attached through the medium of the pins 26 and the draw bar 21 is connected at its forward end by the clevis 23 in one of the openings 24. If the forward end of the draw bar were attached in a horizontal line with the center of the axle 3, the pulling force would be in a plane indicated by the dotted lines $a$, as shown in Fig. 2, but by reason of the fact that the draw bar 21 is connected with the bar 17 at a point somewhat below the horizontal center of the axle 3, the angle of pulling strain thereagainst is changed and would be shifted to the relation indicated by the dotted lines $b$, it of course being understood that the angle will be shifted to be more or less oblique as the clevis is connected with the bar 17 in one of the lower or higher openings 24. As the engine 9 is operated and propelling force is applied to the traction wheels 8, a pulling strain will be exerted on the draw bar and as this pulling strain increases, the tractive weight of the wheels 8 will be correspondingly increased. It will be apparent that raising the connection of the clevis to one of the upper openings 24 will decrease the tractive weight increasing force exerted under a given load, and in the same ratio shifting the clevis to one of the lower openings will increase the tractive weight up to a given angle. As the tractor is propelled forward by the traction wheels 8, the steering may be accomplished by swinging the carrying wheels 7 through turning of the steering wheel 31.

While I have herein shown and described only one specific form of the invention, it will be understood that various modifications in the form and arrangement of the parts might be resorted to without departing from the spirit and scope of my invention and hence I do not wish to be limited to the exact disclosure, but only to such points as may be set forth in the claim.

I claim:

A tractor of the class described comprising a frame, drive wheels supported upon the front of said frame, steering means supporting the rear of said frame, a draw-head carried by the front end of said frame and located intermediate the sides thereof, draft means adjustably connected to said draw-head and extending longitudinally of said frame throughout the entire length thereof, a plurality of converging braces secured at their forward ends to the lower end of said draw-head and provided with rearwardly extending rear ends fitting snugly against and secured to the bottom of said frame for firmly bracing said draw-head, and driving means mounted upon said frame.

In testimony whereof I affix my signature in presence of two witnesses.

CHARLES H. KUGLER.

Witnesses:
A. E. GILBERT,
HOWARD KOCH.